Sept. 13, 1966     E. R. HOLMSTROM ETAL     3,272,688
VINYL SPONGE LAMINATE
Filed May 26, 1965
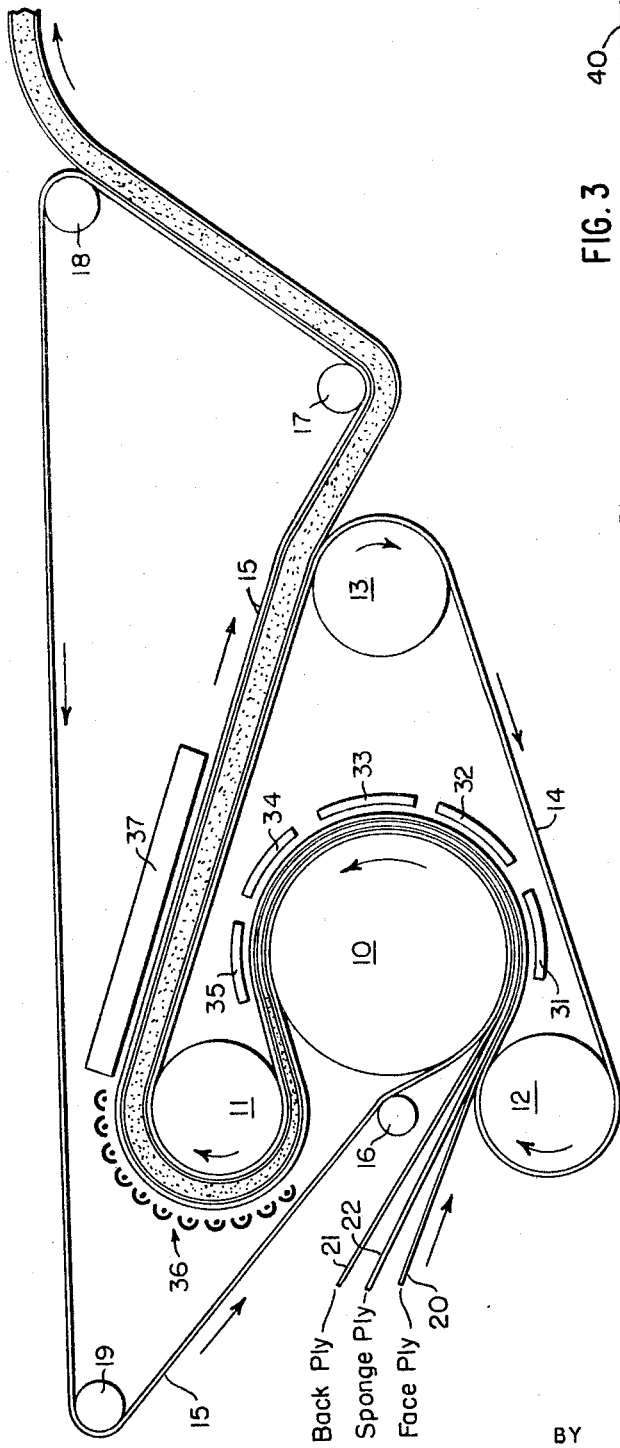
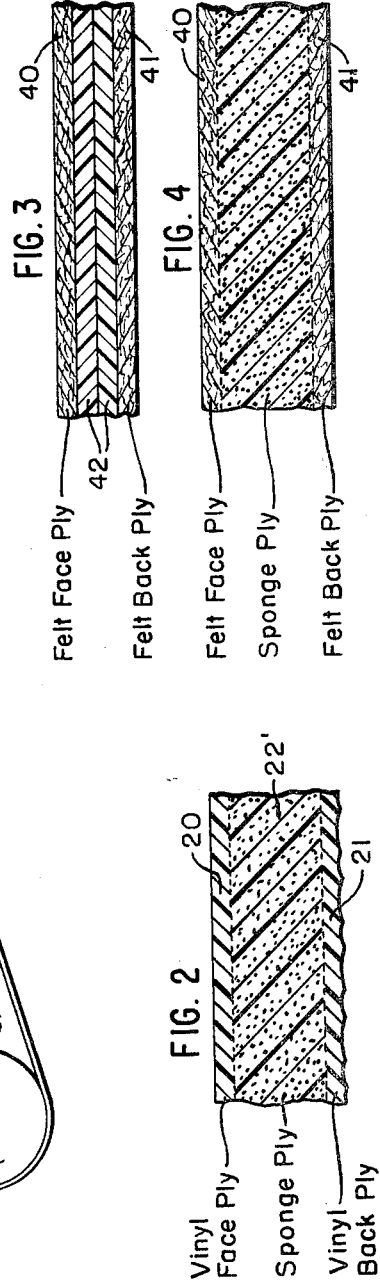
INVENTORS
ERNEST R. HOLMSTROM
DAVID K. SLOSBERG
MERRILL M. SMITH
BY
*Kenway Jenney & Hildreth*
ATTORNEYS

United States Patent Office 3,272,688
Patented Sept. 13, 1966

3,272,688
VINYL SPONGE LAMINATE
Ernest R. Holmstrom, Morrisville, David K. Slosberg, Yardley, and Merrill M. Smith, Morrisville, Pa., assignors to American Biltrite Rubber Co., Inc., Chelsea, Mass., a corporation of Delaware
Filed May 26, 1965, Ser. No. 459,003
1 Claim. (Cl. 161—161)

This invention comprises a new and improved process of making a vinyl sponge laminate and includes within its scope the novel product produced thereby, a product characterized by substantial cushion character with a minimum of bulk. The said process is the subject matter of our copending application Serial No. 256,571 filed February 6, 1963, now U.S. Patent No. 3,220,901, whereof the present application is a continuation-in-part.

The general object of the invention is the production of a cushion type of flooring or underlayment presenting a wear-resisting and preferably ornamental surface ply permanently and securely laminated to an intermediate or underlying cushion ply of vinyl sponge.

We have discovered that the desired results may be achieved by first forming a permanent lamination of solid plies, one only containing a blowing agent, and then subjecting the laminated plies to heat at a temperature above the critical blowing temperature. The step of laminating the solid plies may be readily effected under pressure and heat below the critical blowing temperature and the subsequent blowing step may be carried out while the expansion of the sponge-forming ply is confined and controlled by one or more contiguous plies of dimensional stable sheet material.

An essential characteristic of the process is that the primary lamination of the solid elastomeric plies should be completed at a relatively low temperature and the sponge-forming step delayed until after the conclusion of the laminating step, and then carried out at a relatively higher temperature. For example, the laminating step may be carried out at about 325° F. and the subsequent sponge-forming step at about 360° F.

A preferred type of sponge laminate comprises two plies of solid vinyl compound containing between them a coextensive sponge ply. This may be produced in accordance with the process of our invention by interleaving a solid vinyl ply containing a blowing agent between face and back plies of solid vinyl compound, laminating the three plies together and subsequently conducting the laminated plies through a heating zone at a temperature above the critical blowing point and thus converting the intermediate ply to sponge consistency while confined between the solid face and back plies.

Another type of sponge laminate comprises two cover plies of felt saturated and reinforced by an elastomeric component and permanently bonded to the intermediate vinyl sponge-forming ply by actual penetration into the felt by the vinyl structure.

An important feature of our process is that the sponging step is carried out while the stock is completely supported by and between a metal pressure band and a cooperating band of woven fabric such as duck or canvas. Since the blowing occurs at a temperature well above the plastic stage of the vinyl lamination, an unsupported vinyl stock would be otherwise subject to objectionable distortion and shrinkage.

These and other features and characteristics of our invention will be best understood and appreciated from the following description of preferred apparatus for carrying out the process together with a specimen of one type of its product, selected for purposes of illustration and shown in the accompanying drawings, in which:

FIG. 1 is a diagrammatic view of the apparatus,
FIG. 2 is a sectional view of the vinyl product, and
FIGS. 3 and 4 are sectional views of a felt-covered underlayment.

The invention will first be described as it is carried out in producing the laminate shown in FIG. 2 in which is included a wear-resisting face ply of marbleized vinyl sheeting 20, an intermediate sponge ply 22' and a back ply 21 which has a roughened surface impressed and molded from woven fabric. The product has an overall thickness of about ⅛ inch and is made conveniently in widths of about 40 inches.

The apparatus as shown in FIG. 1 includes a large steam heated drum 10, a driven upper roll 11, a lower roll 12 and a tension roll 13. An endless steel pressure band 14 passes in a generally triangular path about a substantial portion of the drum 10, then in shaped path about the top roll 11, the tension roll 13 and the bottom roll 12 by which it is guided into a bight with the center drum. The tension roll is maintained continuously under outward pressure by hydraulic means not shown, so that the tension band 14 will exert a continuous pressure of from 5 to 70 pounds per square inch upon vinyl sheets introduced between it and the drum 10.

The apparatus also includes an endless fabric band 15 of duck or canvas which is trained to run next to the circumference of the drum 10 and in supporting contact with the back ply. The fabric band 15 is directed by a guide roller 16 into the bight of the drum and the pressure band. It is advanced with the product to a guide roll 17 and then to a stripping roll 18 by which it is removed from the now-cooled product and directed back to a guide roll 19 and again to the guide roll 16.

Three vinyl plies are directed into the bight of the heated drum 10 and band 14 and are carried about a substantial arcuate portion of the drum between the steel pressure band 14 and the fabric band 15. The face ply 20 enters the bight of the drum 10 in the lower position with the sponge ply 21 superposed above it and the back ply 22 uppermost. As before stated the back ply 21 is in direct contact with the fabric band 15 and the face ply in direct contact with the steel pressure band 14. This has a ground and highly polished face which imparts the desired smooth surface texture to the face ply while the fabric band 15 impresses a woven textile-like pattern to the back ply.

In practice the drum 10 is steam heated to about 325° F., the bottom roll 12 to about 320° F., and the top roll 11 to about 360° F. Supplemental segmental heaters 31–35 are arranged concentrical to the drum 10 in close proximity to the pressure band 14 as it moves with the drum. A bank of radiant heaters 36 is disposed about a portion of the circumference of the top roll 11 and an elongated zone heater is arranged in close proximity to the product as it leaves the top roll 11 and is carried between the pressure band 14 and the textile band 15 to the tension roll 13. The supplementary heaters 31–35 may be individually regulated so that the three plies in passing about the drum 10 are heated to the point of plasticity and permanently laminate together. This step takes place at a temperature below the critical point of activating the blowing agent. As the laminated material comes within range of heater 35 and the bank of radiant heaters 36 the temperature of the product is raised above this critical point or to about 360° F. whereupon the intermediate ply 22 is gradually converted to the desired sponge texture. The blowing step may continue wihle the product is passing the zone heater 37 but thereafter the temperature is rapidly dropped and the complete product cools and hardens, though still supported between the steel pressure band 14 and the fabric band 15 until it has passed beyond the tension roll 13. It is then directed by the guide roll 17 and passes to the stripper roll 18 while the fabric band is still embedded therein. At this point it is sufficiently hardened so that the fabric band 15 may be stripped from the product without danger of distortion.

The three plies 20, 21 and 22 may be prepared in conventional manner on three-roll or four-roll calenders, The calendering temperature is about 300° F. which is, of course, well below the temperature required to blow azodicarbonimide (the blowing agent). Resin and plasticizers are selected for good processing at this relatively low calendering temperature.

The *face ply* 20 may be of marbleized vinyl sheeting (gauge about 0.02"—width 40"). The filler content may be slightly lower and the plasticizer content higher than commercial flooring stock to give the finished product greater resilience.

The *back ply* 21 is identical in composition and thickness to the face ply. This prevents different shrinkage rates that would be encountered in dissimilar stocks, sometimes resulting in curling.

The center or sponge ply is vinyl sheeting calendered to the same thickness as the other plies. It is typified by the following formula:

| | |
|---|---|
| Polyvinyl chloride[1] | 56.50 |
| Dioctyl phthalate | 18.61 |
| Butyl benzyl phthalate | 6.64 |
| Epoxidized soya bean oil | 2.66 |
| Kempore SD[2] | 2.25 |
| ABC—50[3] | 1.13 |
| ABC—1[4] | .29 |
| Stearic acid | .29 |
| Calcium carbonate | 11.30 |
| Titanium dioxide | .33 |
| | 100.00 |

[1] Specific viscosity .31 (0.4% solution in nitrobenzene at 25° C.).
[2] 50% dispersion of azodicarbonimide.
[3] ABC-50 is a solid, finely divided complex bimetallic salt possessing lubricating properties.
[4] ABC-1 is an inhibited liquid zinc compound with auxiliary modifiers and contains no lead or cadmium.
Both above are proprietary materials of Advance Div., Carlisle Chemical Co.

The speed of the three plies through the illustrated apparatus is about five feet per minute. In FIG. 1 it is suggested that the blowing operation starts as the stock passes the segmental heater 35 and approaches the top roll 11 but satisfactory results are secured when temperatures are regulated so that blowing starts about half away round the roll 11. The operation is substantially completed under the action of the radiant heaters 36. The sponge ply will increase in thickness to a degree proportional to the concentration of blowing agent and other variables in the formula.

The last few feet of travel on the pressure band 14 is devoted to gradual cooling of the laminate. It is desirable to avoid undue pressure or bending of the stock before cooling as otherwise the cell structure of the sponge ply is impaired.

It will be understood that the pressure of the steel band 14 drops to zero at its points of tangency with the heated drum 10 and the top roll 11. Accordingly the blowing step is carried out under conditions of relatively low pressure. This is important, otherwise, the desired closed-cell structure is destroyed or collapse of all cells may occur.

While the laminate is not under appreciable pressure during the blowing operation, it is being supported, or rather fixed in position, by its tack to the steel band and by the duck band which is embedded in the back ply. The duck is dimensionally stable at sponging temperature and in conjunction with the steel band it prevents the normal distortion of the laminate that would occur if the laminate were blown by a simple oven procedure, without support.

In carrying out the process as above explained the face ply 20 remains in fixed position on the steel band 14 until it has cooled enough to permit stripping of the laminate when it reaches the tension roll 13 at the rear of the machine. In the last few feet of travel on the band 14 the product is cooled and hardened so that bending or pressure has no detrimental effect thereon.

The plies 20–21–22 may be treated successfully in thickness of .02", although we have found that a single sponge ply does not work well if made too thin. The back and face plies may be varied in thickness to any desired degree with due care as to limiting heat transfer to the center sponge ply.

For the face ply a clear vinyl compound may be used with or without printed or other type of surface decoration. Metallic and other colored granules may be included therein. The face ply may be composed of several clear and opaque films or, if desired, spatter or terrazzo effects may be obtained therein.

A sound deadening underlayment such as that shown in FIGS. 3 and 4 may be produced by the process above described by employing cover plies of felt or fabric in place of the vinyl outer plies. Asbestos felt is desirable for this purpose because it is inert, water resistant and mildew-proof, although cellulosic felt or other types of felt could be used. Preferably the felt cover plies are saturated and reinforced with an elastomeric compound such as neoprene, styrene-butadiene etc. Urethane or natural or synthetic rubbers might be used as an alternative for the vinyl sponge.

In all cases the laminating step is carried out by superposing the solid plies in sandwich formation and then subjecting them to pressure and heat below the critical temperature of the blowing agent but sufficient to soften and render plastic the vinyl compound so that it is caused to penetrate into the interstices of the cover plies thus forming a secure and permanent bond between the vinyl structure and the inner surfaces of the cover plies. It will be understood that the laminating step is effected while the intermediate ply remains in solid consistency and before it is converted to sponge formation by the subsequent activation of the blowing agent.

As suggested in FIG. 3 a face ply 40 and a back ply 41, both of asbestos felt impregnated with neoprene, are assembled with a solid intermediate vinyl ply 42 containing a blowing agent such as that above identified. In this case the intermediate ply comprises two sheets or sections of equal thickness. These are employed as an expedient to get a thicker sponge ply with vinyl sheeting commercially available.

The solid plies thus assembled are then introduced into the apparatus of FIG. 1 wherein the laminating step is first carried out in passage about the hot drum 10 and the blowing sponge-forming step is carried out at a higher temperature in approaching and passing about the roll 11.

In the resulting underlayment, as shown in FIG. 4, the surfaces of the blown vinyl ply are permanently bonded by penetration into the body of the felt plies 40 and 41. The two original intermediate sections 42 become bonded together in the laminating step and form an integral body of sponge consistency in the finished underlayment.

The products herein disclosed and claimed are, of course, not restricted in their manufacture to the specific apparatus of FIG. 1.

Having thus disclosed our invention and described in detail an illustrative and suitable manufacturing procedure, we claim as new and desire to secure by Letters Patent:

A laminated underlayment comprising outer cover plies of asbestos felt impregnated and reinforced with an elastomeric component, in combination with an intermediate vinyl ply of blown sponge consistency which is bonded to the inner faces of the cover plies by penetration of the vinyl structure into the interstices of the felt cover plies, said intermediate vinyl ply of blown sponge consistency consisting of two coextensive ply sections united in face-to-face engagement.

References Cited by the Examiner

UNITED STATES PATENTS

| | | | |
|---|---|---|---|
| 2,338,960 | 1/1944 | Nottebohm | 156—78 X |
| 2,762,739 | 9/1956 | Weiss | 161—161 |
| 2,768,091 | 10/1956 | Cubberley | 156—78 |
| 2,983,962 | 5/1961 | Merz | 156—79 |
| 2,993,871 | 7/1961 | Shannon et al. | 156—79 |
| 3,093,525 | 6/1963 | Wilson et al. | 156—79 |
| 3,180,778 | 4/1965 | Rinderspacher et al. | 156—79 |
| 3,188,263 | 6/1965 | Pflaumer | 161—205 X |
| 3,196,062 | 7/1965 | Kristal | 156—79 |

EARL M. BERGERT, *Primary Examiner.*

C. B. COSBY, *Assistant Examiner.*